8350X
N. C. Sanford,
Wood Auger.
Patented Aug. 8, 1834.
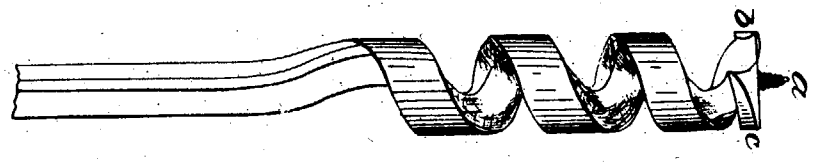

8350X

Aug 8. 1834

Nathaniel C. Sanford

Letters Patent.

The schedule referred to in these Letters Patent and making part of the same, containing a description in the words of the said Nathaniel C. Sanford himself of his improvement in the single twist Spiral Screw Auger, commonly called Le Hommedieu's Patent auger.

To all to whom these presents shall come.
Know ye. that I Nathaniel C. Sanford of Meriden in the County of New Haven and State of Connecticut. a Citizen of the United States, have invented a new and useful improvement in the single twist Spiral Screw auger commonly called L'Hommedieu's Patent auger. which I specify and describe as follows.
This invention or improvement consists in adding to the above named auger a lip or cutter similar to the lip or cutter with which the same has hitherto been made, thus giving the instrument two similar lips or cutters on opposite sides thereof. This may be done by first forging the screw. a. (see the drawing annexed) and shaping the lips, b. c. precisely in the same manner as is now practised in the manufacture of the double twist Spiral Screw auger which is well known to all workmen and manufacturers of that article and when the screw and the lips are thus forged, the metal connected with them is formed into a rod or bar with three sides each slightly convex so that this rod or bar may b twisted in the spiral form in the same manner as the single twist Spiral Screw auger has hitherto been twisted and which also is well known to workmen and manufacturers of that article — and then the instrument thus forged is to be finished off in the usual manner.
This instrument thus improved combines all the advantages of the 8350X Aug 8, 1834 above named and of the double twist spiral screw auger
of the single twist spiral screw auger, also, and is superior
to either, particularly as it delivers the chips formed better
than the latter, and cuts them out, and works into the
wood better and more steadily than the former. I only claim
as my improvement the formation and addition of a second
lip to the common single twist spiral screw auger, which has
hitherto been made with one lip only, so that my improved
instrument is a double lipped single twist spiral screw
auger. I do not claim that I have discovered that augers
may be made with two lips, but only that the above named
instrument may be thus constructed and improved.
In Testimony that the above and foregoing is a true
specification and description of my said improvement
I have hereto set my hand at New Haven this second day
of June A.D. 1834.

Exd. Witnesses Nathaniel C. Sanford
W.H.G. Samuel S. Hitchcock
Anthy H Sanford

1196

Drawing (496 wds)